(12) United States Patent
Abuelsaad et al.

(10) Patent No.: US 10,547,676 B2
(45) Date of Patent: Jan. 28, 2020

(54) REPLICATION OF CONTENT TO ONE OR MORE SERVERS

(71) Applicant: INTERNATIONAL BUSINESS MACHINES CORPORATION, Armonk, NY (US)

(72) Inventors: Kelly Abuelsaad, Poughkeepsie, NY (US); Lisa Seacat DeLuca, San Francisco, CA (US); Soobaek Jang, Hamden, CT (US); Daniel C. Krook, Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 324 days.

(21) Appl. No.: 13/875,839

(22) Filed: May 2, 2013

(65) Prior Publication Data

US 2014/0330782 A1 Nov. 6, 2014

(51) Int. Cl.
*G06F 7/00* (2006.01)
*G06F 17/00* (2019.01)
*H04L 29/08* (2006.01)
*G06F 16/27* (2019.01)

(52) U.S. Cl.
CPC .......... *H04L 67/1095* (2013.01); *G06F 16/27* (2019.01)

(58) Field of Classification Search
CPC ......... G06F 17/30312; G06F 17/30174; G06F 17/30873; G06F 17/30575; G06F 17/30554; G06F 16/27; G06F 16/248
See application file for complete search history.

(56) References Cited

U.S. PATENT DOCUMENTS

| 6,108,703 | A | * | 8/2000 | Leighton ............. G06F 17/3089 707/E17.119 |
| 7,475,246 | B1 | | 1/2009 | Moskowitz et al. |
| 7,979,538 | B2 | | 7/2011 | Grigsby et al. |
| 8,260,913 | B2 | | 9/2012 | Knapp et al. |
| 8,997,240 | B1 | | 3/2015 | Kohen et al. |
| 2002/0026502 | A1 | * | 2/2002 | Phillips .................. H04L 29/06 709/219 |
| 2002/0083148 | A1 | | 6/2002 | Shaw et al. |
| 2002/0184327 | A1 | | 12/2002 | Major et al. |

(Continued)

OTHER PUBLICATIONS

S. Tai et al., "Cloud Service Engineering", ICSE '10, May 2-8, 2010, Cape Town, South Africa, pp. 475-476.

(Continued)

*Primary Examiner* — Hasanul Mobin
(74) *Attorney, Agent, or Firm* — William Hartwell; Andrew M. Calderon; Roberts Mlotkowski Safran Cole & Calderon, P.C.

(57) ABSTRACT

An approach is provided to automatically replicate content to certain servers in a networking environment based on, amongst other metrics, location of third parties accessing information in a social networking environment. The approach includes obtaining content from a user within a networked environment and analyzing information of one or more third parties that have access to the networked environment and who have an association with the user. The approach further includes replicating the content to one or more servers within the networked environment based on the analyzed information of the one or more third parties.

11 Claims, 8 Drawing Sheets

(56) References Cited

U.S. PATENT DOCUMENTS

| | | | |
|---|---|---|---|
| 2003/0046311 A1* | 3/2003 | Baidya | G06F 16/954 |
| 2003/0093523 A1 | 5/2003 | Cranor et al. | |
| 2003/0217113 A1 | 11/2003 | Katz et al. | |
| 2005/0262246 A1* | 11/2005 | Menon et al. | 709/226 |
| 2007/0061378 A1* | 3/2007 | Lee | G06F 16/93 |
| 2008/0071859 A1 | 3/2008 | Seed et al. | |
| 2008/0133767 A1* | 6/2008 | Birrer et al. | 709/231 |
| 2008/0141321 A1 | 6/2008 | Kubat et al. | |
| 2009/0024693 A1* | 1/2009 | Achtermann | G06F 17/30864 709/203 |
| 2009/0083279 A1 | 3/2009 | Hasek | |
| 2009/0100469 A1 | 4/2009 | Conradt et al. | |
| 2009/0144422 A1* | 6/2009 | Chatley | G06F 3/0613 709/226 |
| 2009/0228486 A1* | 9/2009 | Kuehr-McLaren | G06Q 10/10 |
| 2010/0076966 A1* | 3/2010 | Strutton | G06Q 50/01 707/728 |
| 2010/0082575 A1 | 4/2010 | Walker et al. | |
| 2010/0082576 A1 | 4/2010 | Walker et al. | |
| 2010/0094703 A1* | 4/2010 | Bramley et al. | 705/14.45 |
| 2010/0269164 A1 | 10/2010 | Sosnosky et al. | |
| 2010/0306249 A1 | 12/2010 | Hill et al. | |
| 2010/0332330 A1 | 12/2010 | Goel et al. | |
| 2011/0010342 A1* | 1/2011 | Chen et al. | 707/637 |
| 2011/0022669 A1 | 1/2011 | Pascoe et al. | |
| 2011/0191439 A1* | 8/2011 | Dazzi | G06F 15/16 709/217 |
| 2011/0276622 A1* | 11/2011 | Knapp et al. | 709/203 |
| 2011/0296000 A1* | 12/2011 | Ferris et al. | 709/224 |
| 2012/0089704 A1 | 4/2012 | Trahan et al. | |
| 2012/0110071 A1* | 5/2012 | Zhou | G06Q 10/10 709/204 |
| 2012/0209839 A1* | 8/2012 | Andrews et al. | 707/728 |
| 2012/0290647 A1 | 11/2012 | Ellison et al. | |
| 2013/0054628 A1 | 2/2013 | Meierhoefer et al. | |
| 2013/0054729 A1 | 2/2013 | Jaiswal et al. | |
| 2013/0091207 A1* | 4/2013 | Diab | H04W 4/21 709/204 |
| 2013/0198789 A1* | 8/2013 | Streeter | H04N 7/173 725/94 |
| 2013/0268357 A1* | 10/2013 | Heath | H04L 63/00 705/14.53 |
| 2013/0311555 A1* | 11/2013 | Laoutaris | H04L 12/6418 709/204 |
| 2014/0006538 A1 | 1/2014 | Oikonomou | |
| 2014/0149888 A1* | 5/2014 | Morris | G06F 15/16 715/753 |
| 2014/0160029 A1* | 6/2014 | Yuen | G06F 3/04886 345/169 |
| 2014/0207912 A1* | 7/2014 | Thibeault | H04L 67/2847 709/219 |
| 2014/0214964 A1* | 7/2014 | Liyanage | H04L 51/32 709/205 |
| 2014/0244386 A1 | 8/2014 | Mathur | |
| 2015/0269183 A1* | 9/2015 | Avati | G06F 16/1844 707/634 |

OTHER PUBLICATIONS

M.-P. Wen et al., "An Integrated Home Financial Investment Learning Environment Applying Cloud Computing in Social Network Analysis", 2011 International Conference on Advances in Social Networks Analysis and Mining, 2011 IEEE, pp. 751-754.

P. Mell et al., "The NIST Definition of Cloud Computing", National Institute of Standards of Technology, Information Technology Laboratory, Ver 15, Oct. 7, 2009, pp. 1-2.

Office Action dated Apr. 1, 2016 in related U.S. Appl. No. 14/990,224, 18 pages.

Office Action dated Oct. 6, 2016 in related U.S. Appl. No. 14/990,224, 26 pages.

Office Action dated Apr. 27, 2017 in related U.S. Appl. No. 14/990,224, 30 pages.

Final Office Action dated Nov. 2, 2017 in related U.S. Appl. No. 14/990,224, 36 pages.

Office Action dated Mar. 22, 2018 in related U.S. Appl. No. 14/990,224, 39 pages.

Office Action dated Oct. 16, 2018 in related U.S. Appl. No. 14/990,224, 30 pages.

Office Action dated May 30, 2019 in related U.S. Appl. No. 14/990,224, 22 pages.

Notice of Allowance dated Sep. 25, 2019 in related U.S. Appl. No. 14/990,224, 11 pages.

* cited by examiner

REPLICATION OF CONTENT TO ONE OR MORE SERVERS

FIELD OF THE INVENTION

The present invention generally relates to replica of data, and more particularly, to methods and systems for automatic replica of content to certain servers in a networking environment based on, amongst other metrics, location of third parties accessing information in a social networking environment.

BACKGROUND

Computer networking systems are fairly ubiquitous in today's society. These networking systems require vast amounts of storage space to hold content created and posted by the users. This content can range from simple text documents, to pictures and a host of other media types.

A subset of computing networking systems can include social networks which appear to be ever growing and the distribution of its usage being international. Social network providers are increasing their capacity and distributing their content servers or caching servers throughout the world to meet user's expectation of performance. The mechanism of distributing or replicating content is based on the location of the user who is publishing or posting the content. Also, typically, the content is published on all of the servers throughout the social network, e.g., networking environment, generally without regard to storage space.

SUMMARY

In a first aspect of the invention, a method comprises obtaining content from a user within a networked environment. The method further comprises analyzing information of one or more third parties that have access to the networked environment and who have an association with the user. The method further comprises replicating the content to one or more servers within the networked environment based on the analyzed information of the one or more third parties.

In another aspect of the invention, a system is implemented in hardware and comprises a replication engine implemented in at least one server within a networking environment using a processing system. The at least one server receives content from a first user, and the replication engine analyzes information associated with third party users within the networking environment and provides instructions to replicate the content to one or more servers closest to the third party users based on the analyzed information.

In another aspect of the invention, a computer program product comprises a computer readable storage device having readable program code embodied in the storage device and when executed on a computing system is operable to: obtain content from a user; determine locations of third party users wanting to retrieve the content; determine a nearest server to each of the third party users wanting to retrieve the content; and replicate the content for storage on the nearest server of each of the third party users wanting to retrieve the content.

In another aspect of the invention, a computer system for replication of content in a networked environment comprises a CPU, a computer readable memory and a computer readable storage media. The computer system further comprises: program instructions to connect a user to a local server; program instructions to upload content to either the local server or a central server within a networked environment; program instructions to query a replication engine that the content is uploaded to either the local server or the central server within a networked environment; program instructions to provide a replication analysis by determining certain metrics of at least a plurality of third party users having access to the networked environment and that are associated with the user; and program instructions to replicate the content to at least one server that is nearest to the third party users based on the replication analysis. Each of the program instructions are stored on the computer readable storage media for execution by the CPU via the computer readable memory.

In another aspect of the invention, a method of deploying a system for replicating content in a networking environment comprises providing a computer infrastructure, being operable to: obtain content from a user within a networked environment; analyze information of a plurality of third parties that have access to the networked environment and who have an association with the user; and replicate the content to a nearest server to each of the plurality of third parties within the networked environment based on the analyzed information.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to replica of data, and more particularly, to methods and systems for automatic replica of content to certain servers in a cloud environment based on, amongst other metrics, location of third parties accessing information in a social networking environment. In more specific aspects of the present invention, the systems and methods provide a mechanism for replicating the content in servers located nearest third parties (e.g., followers or friends of the user) who are accessing information of a user. The replication of content can be based on such metrics as: specific types of content which are likely to be accessed by the third parties, specific servers at locations nearest the third parties, as well as a host of other features as described herein.

As a further example, the methods and systems of the present invention obtain location information of followers and friends, e.g., third parties associated with a particular user, as well as usage patterns of the third parties, e.g., types of information and data retrieved by the third parties, patterns of traffic, etc. The methods and systems of the present invention can then use this information to replicate content (i.e., certain content from an originating user) to servers closest to the third parties accessing such content, amongst other metrics and criteria. In this way, it is no longer necessary to replicate data at each datacenter in the cloud environment or social network.

Advantageously, the present invention increases performance of the cloud environment by, for example, decreasing retrieval times of third party access to content, as well as reducing the replication of content throughout the cloud environment. For example, by implementing the systems and methods of the present invention, there is no need to replicate the content to every datacenter, e.g., server, thereby more efficiently and effectively using storage space in the cloud environment.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure including a network of interconnected nodes.

Figure 1:
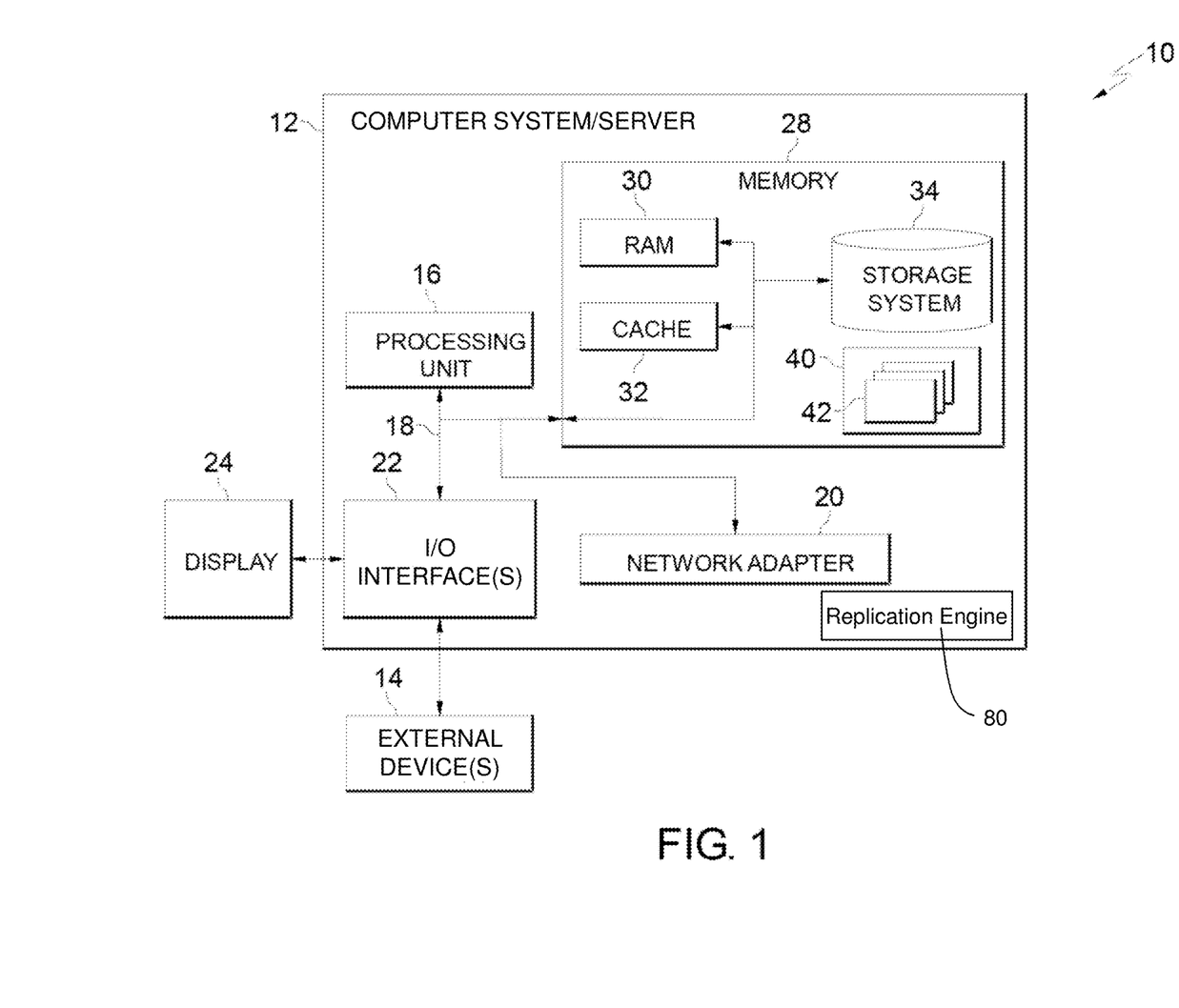
FIG. 1 depicts a hardware configuration according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16 (e.g., CPU). In embodiments, computer system/server 12 includes or communicates with a replication engine 80 as described in greater detail herein.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, some or all of the functions of replication engine 80 may be implemented as one or more program modules 42.

Additionally, replication engine 80 may be implemented as separate dedicated processors or a single or several processors to provide the functionality described herein. The replication engine 80 can be implemented in a processing system for analyzing information associated with third party users, and providing instructions to replicate content of a first user on one or more servers closest to the third party users. More specifically, in embodiments, replication engine 80 performs one or more of the processes described herein in any contemplated combination, including but not limited to determining:

preferences (profiles) of the user originating the content;
location of third parties in a cloud environment who are previously requested content from the originating user;
usage patterns (e.g., historical patterns) of the third parties or portions thereof;
preferences (profiles) of the third parties requesting content from the user;
types of content that are retrieved by the third parties (i.e., types of files such as video files, pictures, etc.);
the location of servers that are nearest to the third parties; and/or
what information should be replicated to certain servers based on such considerations as load balancing, data type, data size, etc.

Based on the above criteria, the processes of the present invention can replicate certain information for storage at certain, predetermined servers. For example, the replicating of the content takes into consideration the closest servers to the third parties wanting to view the posted content, and replicates the content to only such servers. Similarly, based on preferences of the third parties, the content can be replicated to a location of any of the one or more servers nearest to third parties that have a preference indicative of wanting to view the content. Similarly, based on historical usage patterns, the content can be replicated to a location of any of the one or more servers nearest to third parties that have historical usage patterns showing a pattern indicative of wanting to view similar content to the content posted by the user. This same or similar analysis and replication is provided for any of the examples provided herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
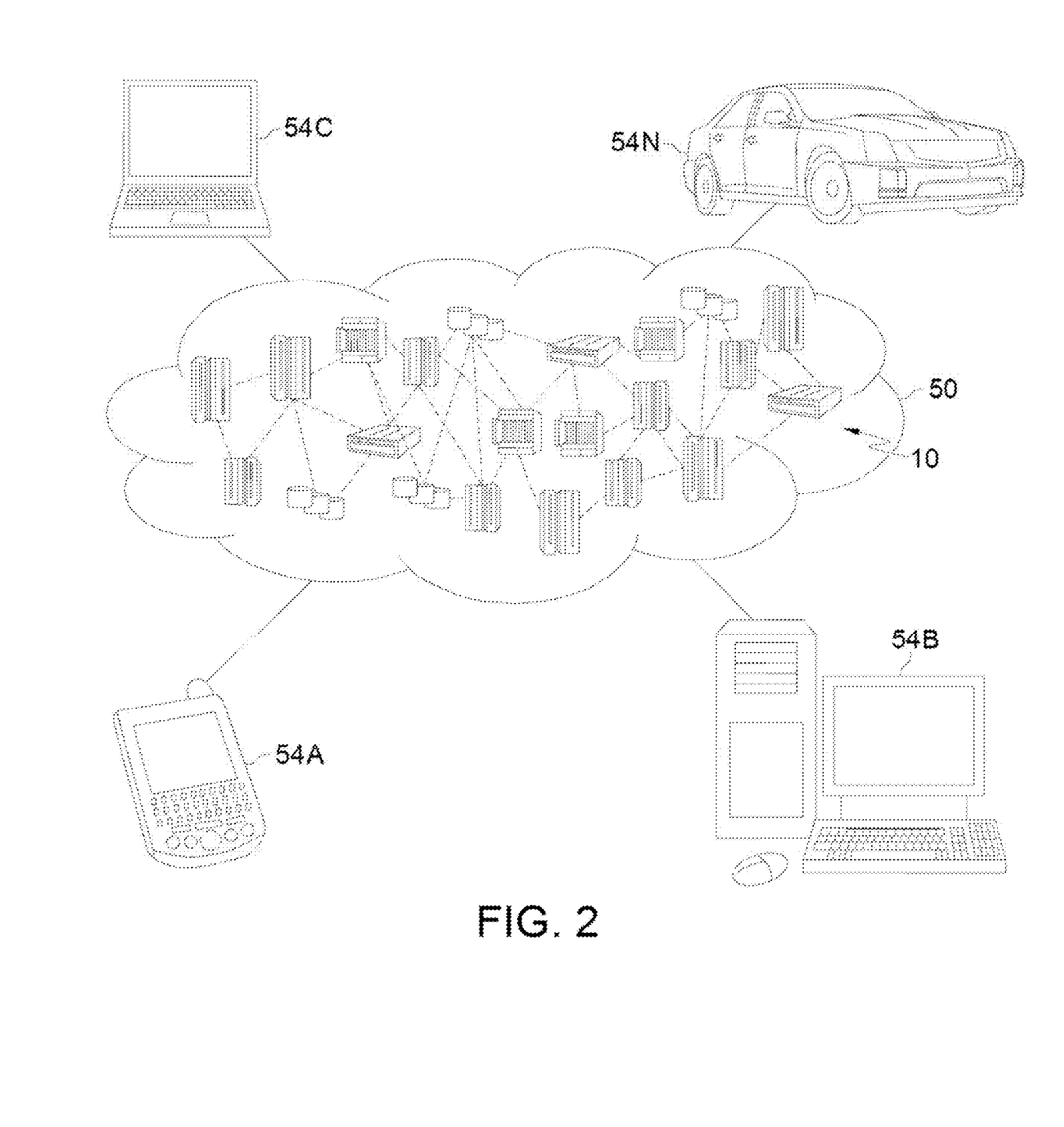
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
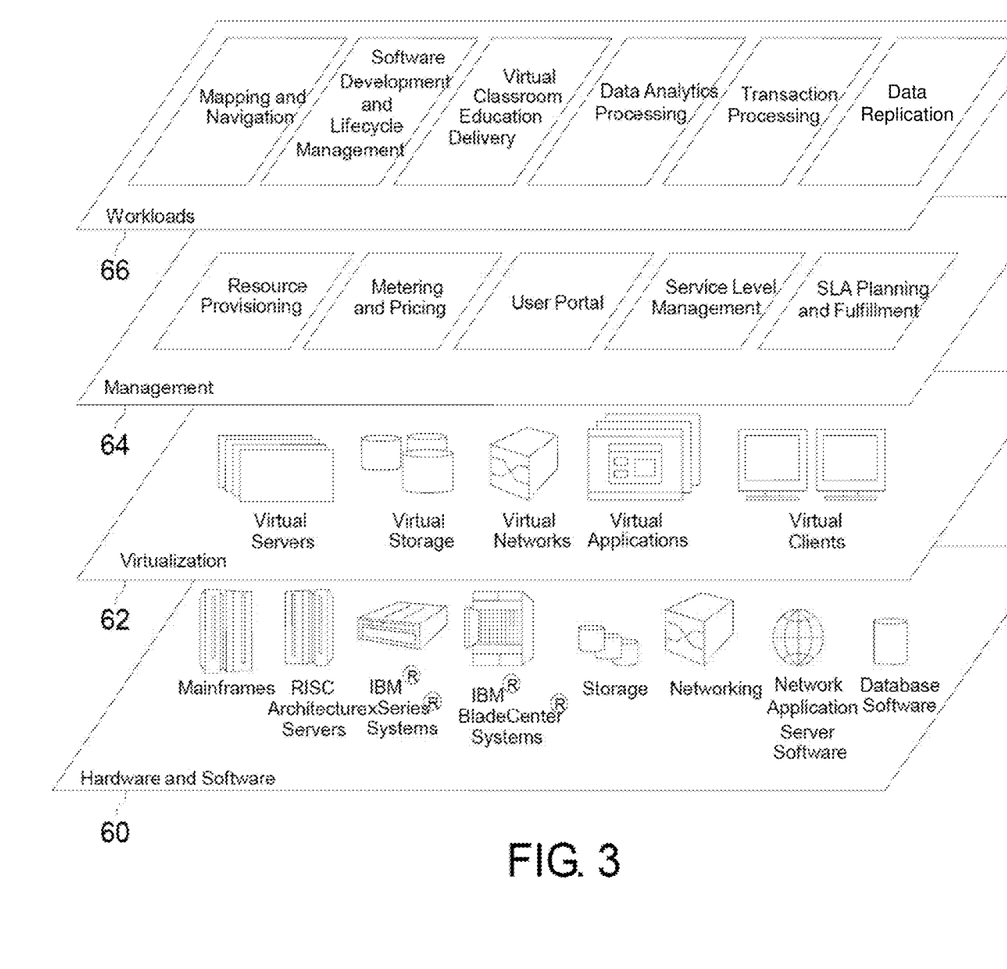
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data replication. In accordance with aspects of the invention, the data replication workload/function operates to perform one or more of the processes of the replication engine 80 described herein, including but not limited to:

determine the preferences (profiles) of the user originating the content;

determine the preferences (profiles) of the third parties requesting the content;

determine the location of third parties in a cloud environment who have requested/viewed content from the user, e.g., friends and/or followers on a social network;

determine usage patterns of the third parties or portions thereof;

determine types of content that are retrieved by the third parties (i.e., types of files such as video files, pictures, etc.);

determine the location of servers that are nearest to the third parties;

determine whether certain thresholds have been met, e.g., a certain amount or certain percentage of third parties are at a certain location; and/or replicate the data to certain servers.

As will be appreciated by one skilled in the art, aspects of the present invention, including replication engine 80 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this description, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Block Diagrams and Exemplary Operation

Figure 4:
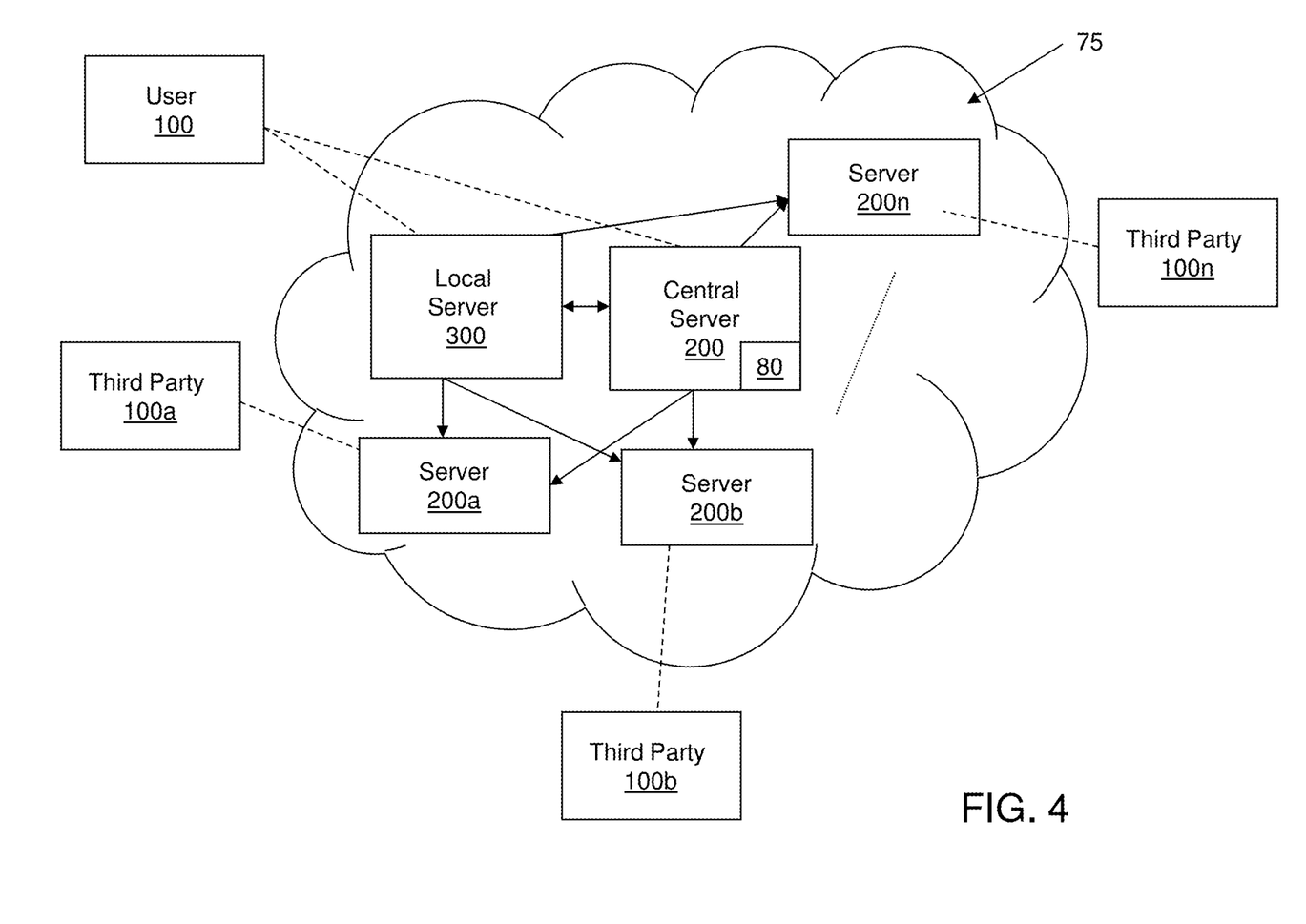
FIG. 4 depicts a block diagram of a replication engine in a networking environment in accordance with aspects of the invention.

FIG. 4 depicts a block diagram of a replication engine in a networking environment in accordance with aspects of the invention. More specifically, FIG. 4 shows a networking environment 75, which can be any social networking environment or cloud environment, accessible by users 100, 100a, 100b, . . . 100n. In embodiments, user 100 is the originator (poster) or publisher of content, and users 100a, 100b, . . . 100n can be friends and/or followers of the user 100, wishing to obtain or view the content posted by user 100. The content originating from user 100 can be stored on either a central server 200 or a local server 300, depending on the rules and configuration of the networking environment 75. As should be understood by those of skill in the art, the content can be any type of content including, but not limited to, video files, pictures, text, media, or other content, etc.

As shown in this exemplary illustration, both central server 200 and local server 300 are in communication with servers 200a, 200b, . . . 200n. In this way, content can be passed between and stored on any combination of servers. In this exemplary configuration, central server 200 includes replication engine 80; although, the present invention contemplates any combination of servers also including the replication engine 80.

By using replication engine 80 in accordance with aspects of the present invention, information stored on any of the servers can be shared or replicated on any combination of the servers taking into consideration the different criteria set forth herein. For example, content stored on local server 300 can be replicated and stored on any of the servers 200a, 200b, . . . 200n, in accordance with aspects of the present invention. More specifically, in this exemplary illustration, content originating from user 100 can be uploaded to either of central server 200 or local server 300, depending on the particular rules of environment 75. In any scenario, upon receipt of the content (from user 100), replication engine 80 will make a determination (analysis) as to which servers 200a, 200b, . . . 200n will receive replicated content, originating from user 100. This determination can be made based on many different combinations of factors including, for example:

which users 100a, 100b, . . . 100n are friends and/or followers of user 100;

the physical location of the friends and/or followers and a nearest server 200a, 200b, . . . 200n to the physical location of the friends and/or followers;

the type of content which is being published by the originating user, e.g., media, etc.;

the type of content which has previously been reviewed and/or requested by the friends and/or followers (or other preferences of the friends and/or followers);

historical usage patterns of the friends and/or followers;

whether certain thresholds have been met, e.g., a predetermined number or percentage of friends and/or followers are located at a certain location, near a certain server, access certain types of information, etc.; and/or other types of quantitative information such as, for example, quality of servers, load balancing issues, quality of content for each server, etc.

In the scenario that replication engine 80 is resident on central server 200, local server 300 will query central server 200, i.e., replication engine 80, in order to prompt replication engine 80 to provide the above analysis. Upon such analysis/determination, replication engine 80 will direct either central server 200 or local server 300 to replicate the appropriate content and provide such content to the appropriate server 200a, 200b, . . . 200n. The content can be saved on any of the servers, depending on the specific analyzed criteria and subsequent rules. In this way, the content does not have be replicated and stored on each and every server, thus more efficiently utilizing current resources.

Figure 5A:
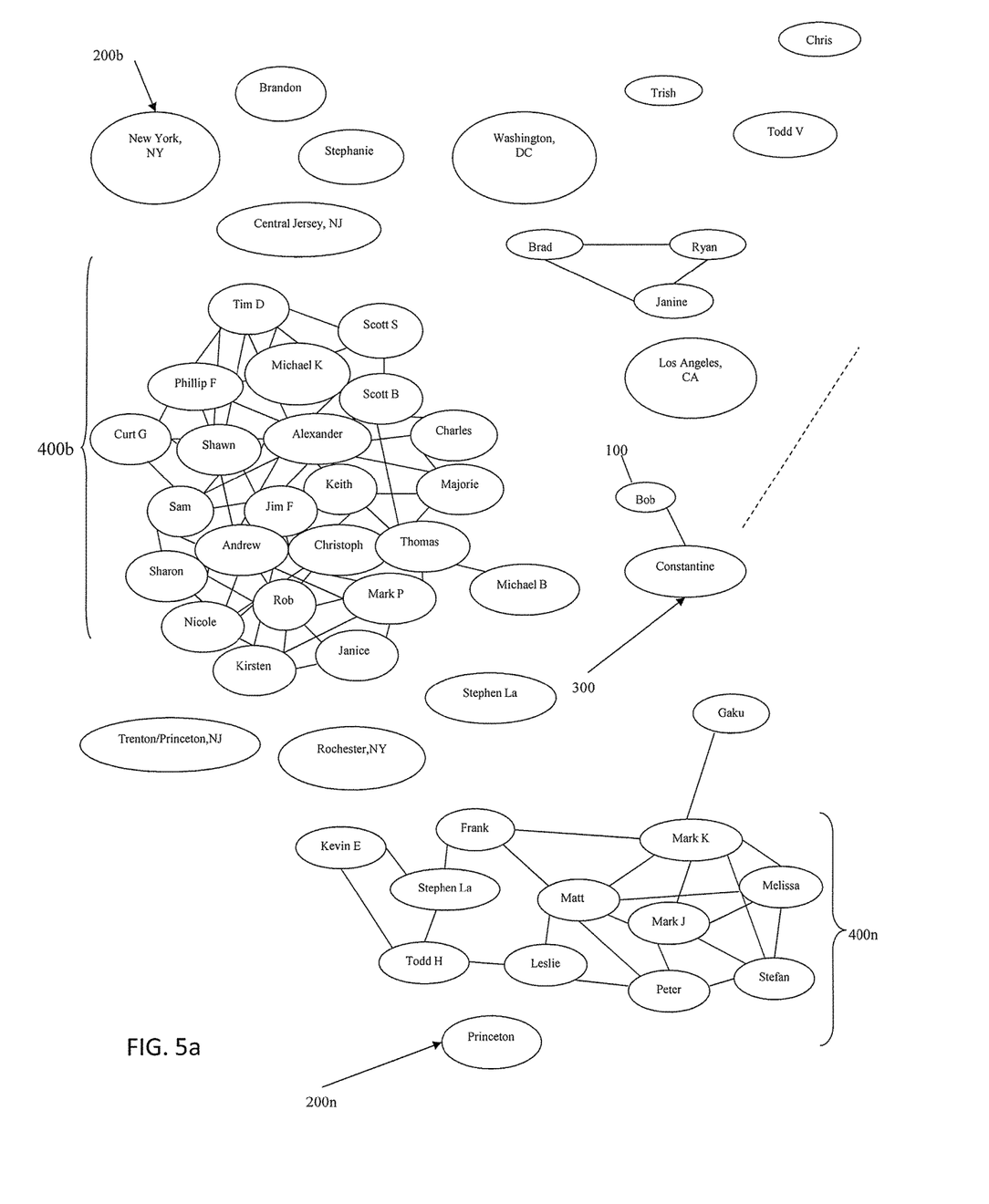
FIGS. 5a and 5b shows a visualization of interactions between servers and clusters of friends and/or followers, in accordance with aspects of the preset invention.
Figure 5B:
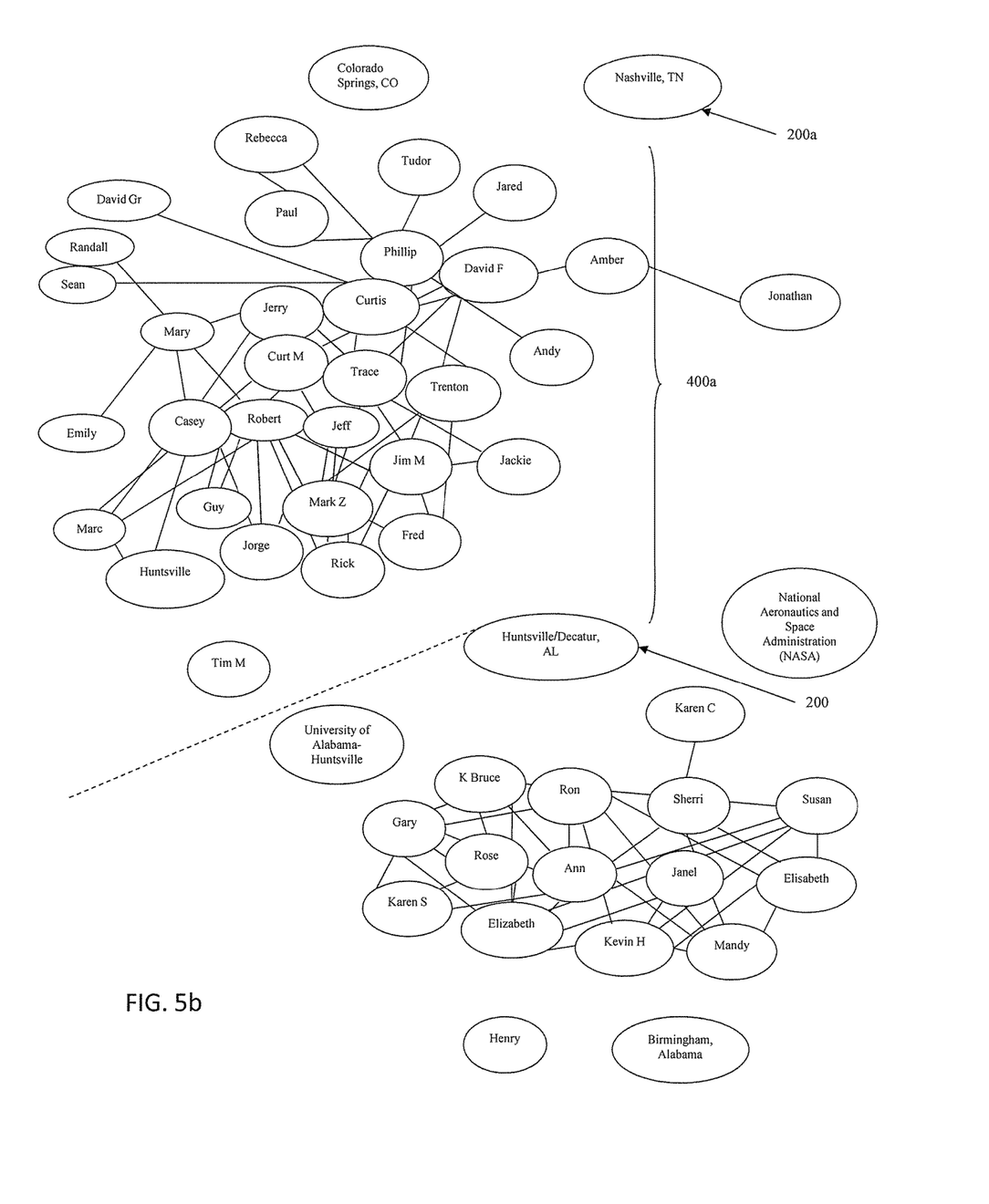

FIGS. 5a and 5b show a visualization of interactions between servers and clusters of friends and/or followers, in accordance with aspects of the preset invention. In particular, FIGS. 5a and 5b show a visualization of several clusters of users (e.g., friends and/or followers) 400a, 400b, . . . 400n, interacting with one another and with respective servers 200a, 200b, . . . 200n within a networking environment. FIGS. 5a and 5b also show a central server 200 and a local server 300. In this example, content from user 100 can be stored on local server 300. The local server 300 can query the central server 200 to determine replication and storage of content, e.g., on servers 200a, 200b, . . . 200n.

By way of illustrative non-limiting example, the replication engine can determine that there is a heavy concentration of users 400n, near server 200n. The replication engine can then direct that the replicated content be stored on server 200n. In another illustrative non-limiting example, the replication engine can determine that the concentration of users 400b and 400n are over a threshold number or percentage, e.g., 50 users, and then direct the replicated content to be stored on servers 200b and 200n, which have been determined to be the closest servers to users 400b and 400n. In yet another illustrative non-limiting example, the replication engine can determine that the users 400a and 400b have a history of viewing, e.g., media data, from the user 100, and request replication of only media data of the user 100 to be stored on servers 200a and 200b. Of course, other examples are also contemplated by the present invention, including, use of historical usage patterns and any combination of the above examples, etc.

Flow Diagrams

Figure 6:
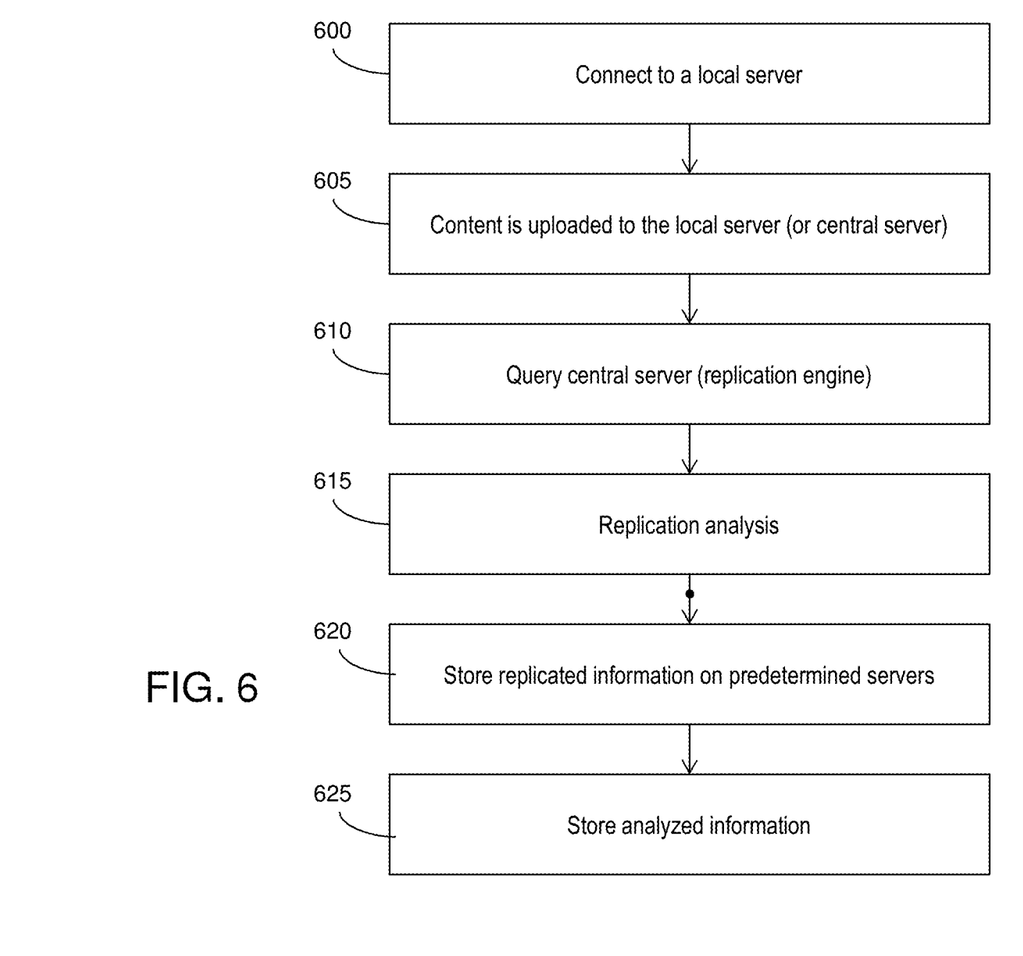
FIGS. 6 and 7 show exemplary flows in accordance with aspects of the invention.
Figure 7:
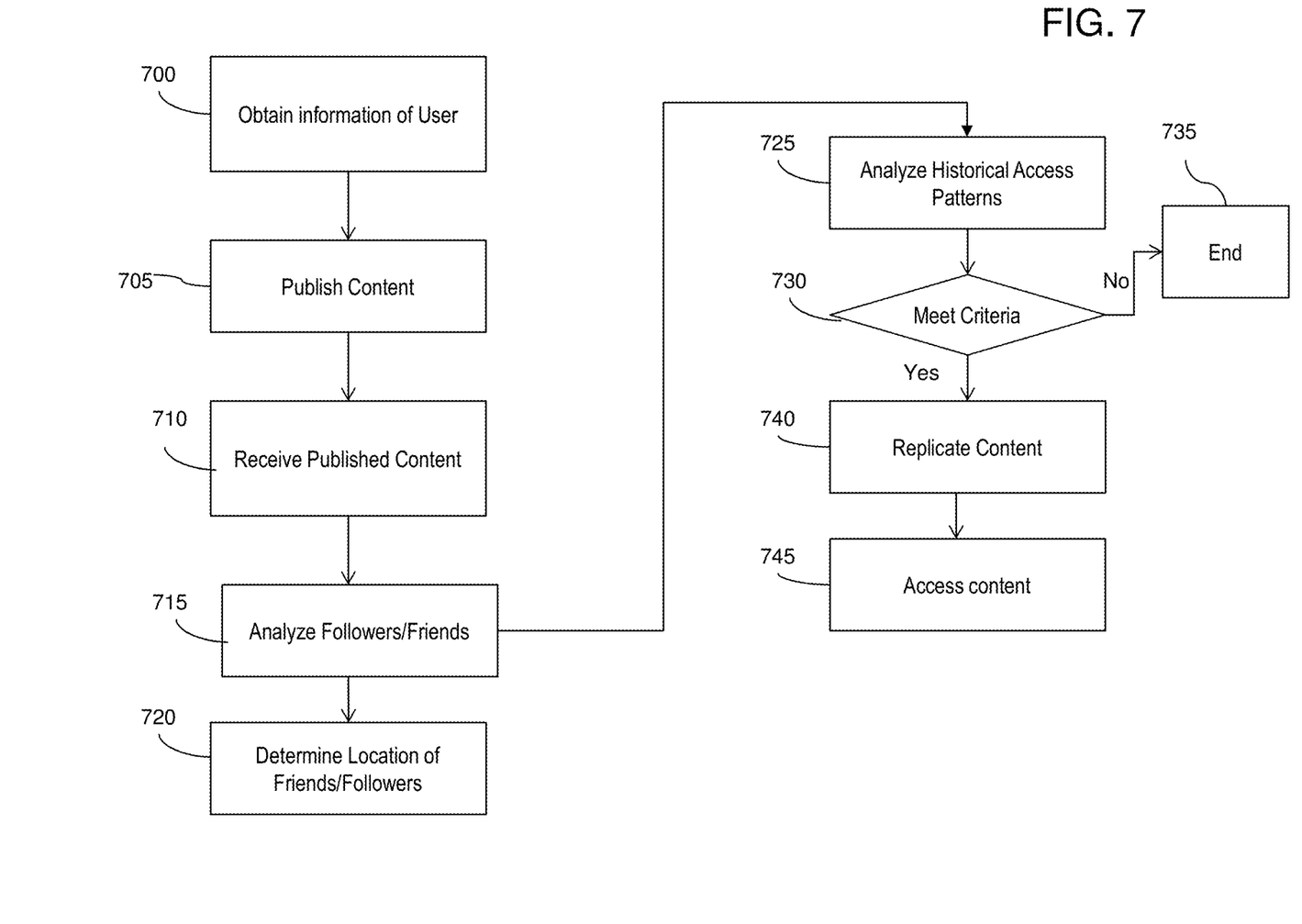

FIGS. 6 and 7 show exemplary flows for performing aspects of the present invention. The steps of FIGS. 6 and 7 may be implemented in any of the environments of FIGS. 1-5, for example. The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in any one or more of the environments of FIGS. 1-5.

FIG. 6 depicts an exemplary flow for a process in accordance with aspects of the present invention. At step 600, a user will connect to a networking environment, e.g., local server on the networking environment. At step 605, the content will be uploaded to the local server or a central server, depending on the configuration of the networking environment. For example, the central server can be a local server, which serves as a storage repository of information for the user. In any scenario, at step 610, the replication engine is queried to analyze which servers should receive replicated content for storage, to be later retrieved by a friend and/or follower of the user. At step 615, the replication engine can make an analysis based one or a combination of several criteria, including but not limited to:

preferences (profiles) of the user originating the content;
preferences (profiles) of the third parties requesting content from the user. These preferences (profiles) may be the type of data they like to view, the size of the data they prefer to download, etc., any of which can be associated with the user or other third parties, or friends of friends, etc.;
location of third parties in a cloud environment who are associated with an originator of content, e.g., friends and/or followers on a social network, and the location of servers nearest to such third parties;
usage patterns of the third parties or portions thereof;
types of content that are retrieved by the third parties (i.e., types of files such as video files, pictures, etc.);
whether certain thresholds have been met, e.g., a certain amount or percentage of third parties are at a certain location; and/or
what content should be replicated to certain servers based on, for example, load balancing considerations, data type, data size, etc.

At step 620, based on the above criteria, the processes of the present invention can replicate certain information for storage at certain, predetermined servers. For example, the replicating of the content comprises replicating the content on one or more servers closest to a location of any of the one or more third parties that have a preference indicative of wanting to view the content. Similarly, the replication of the content comprises replicating the content on one or more servers closest to a location of any of the one or more third parties that have historical usage patterns showing a pattern indicative of wanting to view similar content to the content. This same or similar analysis and replication is provided for any of the examples provided herein, based on the third party information.

At step 625, the information obtained during the analysis can be saved in a central storage, to be used at a later time for further analysis, e.g., replication and storage of content. For example, the preferences (profiles) of the originating user or the friends and/or followers can be saved in a central storage so that this same information does not need to be gathered again at a later time. The processes of the present invention can also use this saved information to perform historic usage pattern analysis, more readily determine locations of the originating user or the friends and/or followers and respective servers, etc.

FIG. 7 depicts an exemplary flow for a process in accordance with aspects of the present invention. At step 700, a network provider (e.g., system or process) obtains information on the users and followers and/or friends associated with the users. At step 705, a user publishes content on their social network. This published content can include, amongst other information, status update, file information, media type, etc. At step 710, the system receives the published content by the user and may review this information for the type of information, the size of the information, etc.

At step 715, the system analyzes the followers and/or friends of the user. This may include, for example, their location, preferences and/or profiles, usage patterns and types of content typically viewed from the user, etc. At step 720, the system determines the portion of followers and/or friends of that user by location. For example, the social network provider system determines how many users are located near each local server and whether certain thresholds are met. Optionally, at step 725, historical access patterns may also be gathered, e.g., while most of a user's followers are in location #1, more users in location #2 play movies posted by the user. By way of another example, depending on the context of the message certain users tend to be more likely to read the content, e.g., content about vacations, movies, and other events.

At step 730, the system determines whether the portion of followers and/or friends for each location, as determined from step 720, meets criteria of replicating content. For example, the criteria may be a threshold of a percentage of followers being at a certain location or a number of followers above a certain threshold, e.g., 100 are at a certain location. If the threshold is not met, then at step 735, the process ends. However, if the threshold is met, at step 740, the system replicates the content to those servers (datacenters) in the qualified location or location closest to that qualified location. At step 745, the followers and friends of the user can then access the content (or the system publishes the aggregated content of each user's followers/friends) at their local or nearest server. Since the content is being served by a closer datacenter, the content is likely to be displayed faster or at a higher quality. Accordingly, the processes and systems of the present invention help not only performance issues, but also reduce the replication of content.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   connecting, by a central server, a computer device of a user to a local server;
   enabling, by the central server, uploading of content of the user to either the local server or the central server within a networked environment;
   querying, by the central server, a replication engine that the content is uploaded to either the local server or the central server within the networked environment;
   determining, by the central server, third party users associated with the user within the networked environment;
   obtaining, by the central server, information of the user and the third party users associated with the user based on the upload of the content, wherein the third party users associated with the user are a subset of a total number of third party users in the networked environment, and wherein the information comprises whether a predetermined number of the third party users have met a threshold value comprising a predetermined number of third party users near a particular location;
   providing, by the central server, a replication analysis utilizing the information by determining certain metrics of at least a plurality of the third party users associated with the user, including whether the predetermined number of the third party users have met the threshold value; and
   selectively replicating, by the replication engine, the content to at least one server that is nearest to one or more of the third party users who have met the threshold value based on the replication analysis.

2. The method of claim 1, wherein the at least one server comprises a plurality of servers, and the information of the third party users includes locations of the respective third party users.

3. The method of claim 1, wherein:
   the information of the third party users includes one or more preferences of the third party users; and
   the replicating of the content further comprises replicating the content based on the one or more preferences of the third party users.

4. The method of claim 1, wherein:
   the information of the third party users includes historical patterns of the third party users; and
   replicating the content further comprises replicating the content based on the historic patterns.

5. The method of claim 1, wherein the information of the third party users includes a type of content previously reviewed by the one or more third party users.

6. The method of claim 1, wherein the networked environment is a social network within a computing environment.

7. The method of claim 1, wherein a service provider at least one of creates, maintains, deploys and supports a computer infrastructure implementing the steps of claim 1.

8. The method of claim 1, wherein steps of claim 1 are provided by a service provider on a subscription, advertising, and/or fee basis.

9. A computer program product comprising a computer readable hardware storage device having readable program code stored on the computer readable hardware storage device, the program code causing the computing device to:
   connect a computer device of a user to a local server;
   enable uploading of content of the user to either the local server or a central server within a networked environment;
   query a replication engine that the content is uploaded to either the local server or the central server within the networked environment;
   determine third party users associated with the user within the networked environment;
   obtain information of the user and the third party users associated with the user based on the upload of the content, wherein the third party users associated with the user are a subset of a total number of third party users in the networked environment, and wherein the information comprises whether a predetermined number of the third party users have met a threshold value comprising a predetermined number of third party users near a particular location;

provide a replication analysis utilizing the information, by determining certain metrics of at least a plurality of the third party users associated with the user, including whether the predetermined number of the third party users have met the threshold value; and selectively replicate the content to at least one server that is nearest to one or more of the third party users who have met the threshold value based on the replication analysis.

10. A computer system for replication of content in a networked environment, the system comprising:

a CPU, a computer readable memory and a computer readable storage media;

program instructions to connect a computer device of a user to a local server;

program instructions to upload content of the user to either the local server or a central server within a networked environment;

program instructions to query a replication engine that the content is uploaded to either the local server or the central server within the networked environment;

program instructions to determine third party users associated with the user within the networked environment;

program instructions to obtain information of the user and the third party users associated with the user based on the upload of the content, wherein the third party users associated with the user are a subset of a total number of third party users in the networked environment, and wherein the information comprises whether a predetermined number of the third party users have met a threshold value comprising a predetermined number of third party users near a particular location;

program instructions to provide a replication analysis utilizing the information, by determining certain metrics of at least a plurality of the third party users associated with the user, including whether the predetermined number of the third party users have met the threshold value; and program instructions to selectively replicate the content to at least one server that is nearest to one or more of the third party users who have met the threshold value based on the replication analysis, wherein each of the program instructions are stored on the computer readable storage media for execution by the CPU via the computer readable memory.

11. The computer program product of claim 9, wherein the third party users are indicated as friends or followers of the user within a social network.

* * * * *